United States Patent [19]

Morino

[11] Patent Number: 4,610,423
[45] Date of Patent: Sep. 9, 1986

[54] POPPET VALVE

[75] Inventor: Ichiro Morino, Zama, Japan

[73] Assignee: Toshiba Kikai Kabushiki Kaisha, Tokyo, Japan

[21] Appl. No.: 708,579

[22] Filed: Mar. 5, 1985

[30] Foreign Application Priority Data

Mar. 6, 1984 [JP] Japan .............................. 59-31829[U]
Mar. 8, 1984 [JP] Japan .............................. 59-33387[U]

[51] Int. Cl.$^4$ .............................................. F16K 31/12
[52] U.S. Cl. .......................................... 251/25; 251/36
[58] Field of Search ...................... 251/25, 30, 31, 36

[56] References Cited

U.S. PATENT DOCUMENTS 1,575,851  3/1926  Long ..................................... 251/25
4,482,127  11/1984  Hafele ................................ 251/25

FOREIGN PATENT DOCUMENTS 1045755  12/1958  Fed. Rep. of Germany ........ 251/25
561174    6/1977   U.S.S.R. ................................. 251/25
872888   10/1981   U.S.S.R. ................................. 251/25

Primary Examiner—James C. Yeung
Attorney, Agent, or Firm—Stevens, Davis, Miller & Mosher

[57] ABSTRACT

In a poppet valve having a poppet slidingly movable in a casing formed with an inlet port and an outlet port through which a pressurized fluid such as oil is supplied and delivered, the cross-sectional area of a rear end of the poppet to which one part of the pressurized fluid is applied under the control of a pilot spool provided slidably in the poppet is made larger than the cross-sectional area of a forward end of the poppet to which the pressurized fluid supplied into the inlet port is applied directly.

6 Claims, 2 Drawing Figures

POPPET VALVE

BACKGROUND OF THE INVENTION

This invention relates to a poppet valve in which a pilot spool is used for controlling a poppet, and the flow of a pressurized fluid is thereby controlled.

In an ordinary construction of the poppet valve, since the pilot spool is provided to extend outside through a chamber formed on the rear side of the poppet, the cross-sectional area of the rearward end of the poppet in the chamber is smaller than the cross-sectional area of the forward end of the poppet, to which the pressurized fluid supplied to the poppet valve is directly applied. As a consequence, an additional device such as a spring must be provided in the chamber for augmenting the pressure of one part of the pressurized fluid introduced in the chamber when the poppet is to be retracted for interrupting the flow of the pressurized liquid. However, the provision of the spring not only complicates the construction of the poppet valve, but also entails various difficulties such that the spring force must be changed in accordance with the variation of the pressure of the pressurized fluid and design of the spring becomes difficult when the stroke of the poppet is large. For obviating the above described difficulties, a construction utilizing a separate control liquid of a higher pressure than that of the controlled fluid has been proposed. However, such a construction exhibits a difficulty of further complicating the poppet valve.

SUMMARY OF THE INVENTION

An object of this invention is to provide a poppet valve in which all the difficulties of the conventional poppet valves can be substantially eliminated.

Another object of this invention is to provide a poppet valve in which the cross-sectional area of the rear end of the poppet is made larger than that of the forward end of the poppet.

These and other objects of the present invention can be achieved by a poppet valve of a type comprising a valve casing having a central hole one end of which opens outwardly, a cover provided to close the opening end of the central hole, a poppet inserted slidably in the central hole of the casing, a pilot spool inserted through the cover into a central hole of the poppet, inlet and outlet ports provided in the casing for flowing a pressurized fluid therethrough, first passage means for introducing under the control of the pilot spool one part of the pressurized fluid supplied to the inlet port into a chamber formed between a rear end of the poppet and the cover thereby to displace the poppet for interrupting the flow of the pressurized fluid from the inlet port to the outlet port, and second passage means for discharging under the control of the pilot spool the part of the pressurized fluid from the chamber to an outside reservoir thereby to displace the poppet so as to permit the flow of the pressurized fluid from the inlet port to the outlet port, and in the improvement, the poppet is constructed to be provided with a rear end in the chamber having a cross-sectional area larger than that of a forward end of the poppet, on which the pressure of the pressurized fluid is applied directly.

DESCRIPTION OF THE PREFERRED EMBODIMENTS

Figure 1:
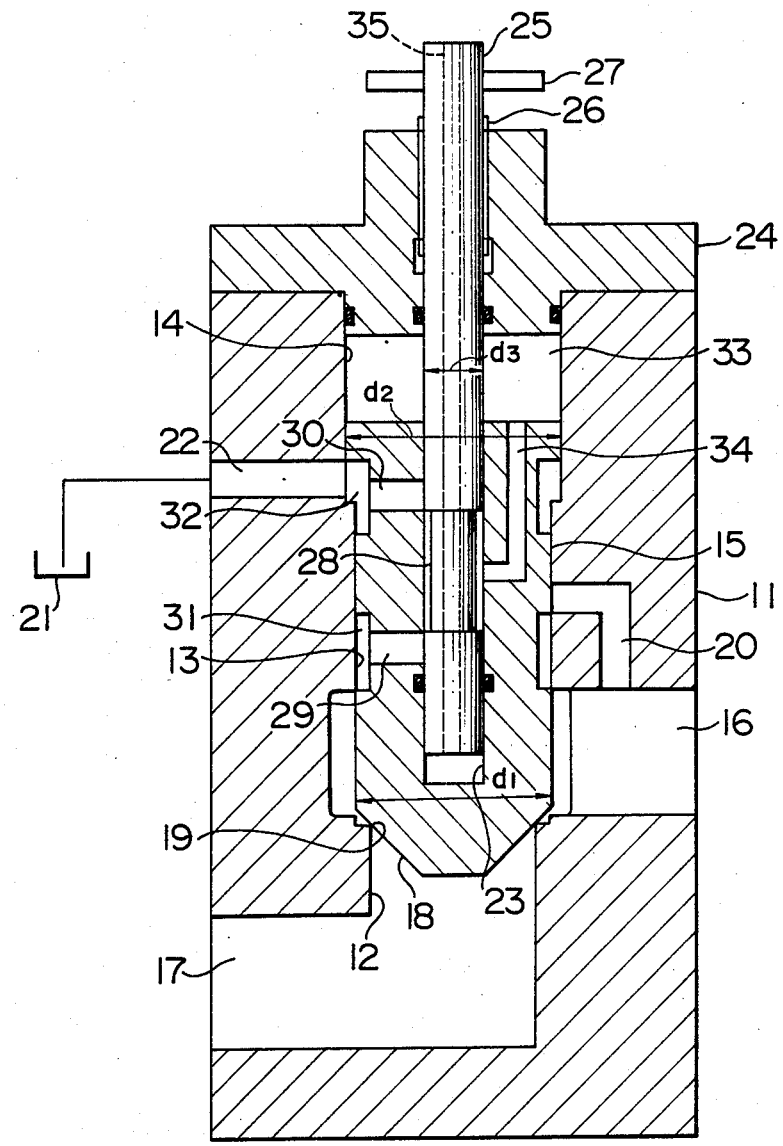
FIG. 1 is a longitudinal sectional view showing a preferred embodiment of a poppet valve of this invention.

Referring now to FIG. 1 showing a preferred embodiment a poppet valve according to this invention, which comprises a hollow cylindrical casing 11 having a central hole formed into three stepped portions 12, 13 and 14. A cover 24 is provide to close the upper end of the casing 11.

A poppet 15 formed into two stepped portions having outer diameters $d_1$ and $d_2$ is inserted slidably into the stepped portions 13 and 14 of the central hole of the casing 11.

Through a lower end portion of the casing 11 as viewed in FIG. 1, an inlet port 16 is provided at a position opposing to the forward end portion of the poppet 15 having an outer diameter $d_1$, so that a pressurized fluid such as oil is received in the inlet port 16. The forward end portion 12 of the central hole of the casing 11 disposed downward is bent at right angles to be formed into an outlet port 17. A valve seat 19 engageable with a tapered end portion 18 of the poppet 15 is formed along the step between the hole portions 12 and 13. The flow of the pressurized fluid is controlled by the gap between the valve seat 19 and the tapered end portion 18 of the poppet 15. Fluid passages 20 and 22 are provided to extend through the casing 11 between the inlet port 16 and the stepped hole portion 13, and between the hole portion 14 and a reservoir 21, respectively. The poppet 15 is also provided with a central hole 23 extending longitudinally. A pilot spool 25 passing through the cover 24 is inserted slidably into the central hole 23 of the poppet 15. The pilot spool 25 has a screw-threaded portion 26 engageable with a corresponding portion of the cover 24, and is moved upwardly and downwardly in accordance with the rotation of a handle 27. The pilot spool 25 has a reduced diameter portion 28 provided to extend intermediately along its length. Fluid passages 29 and 30 are provided to extend radially through the poppet 15 at positions which are located closely adjacent to the upper and lower extremities of the reduced diameter portion 28 of the pilot spool 25 when the pilot spool 25 is held at a position shown FIG. 1. The fluid passages 29 and 30 are formed in communication with annular grooves 31 and 32 formed around the outer surface of the poppet 15, respectively. Another fluid passage 34 is formed through the poppet so as to extend between the reduced diameter portion 28 of the pilot spool 25 and a chamber 33 which is in turn formed between the upper surface of the poppet 15 and the lower surface of the cover 24.

Assuming that the outer diameter of the pilot spool 25 is $d_3$, the outer diameters $d_1$ and $d_2$ of the stepped portions of the poppet 15 are selected to satisfy the following relation:

$$(\pi/4)(d_2^2 - d_3^2) > (\pi/4) d_1^2$$

The pilot spool 25 is further provided with a longitudinal extending central hole 23 for exhausting air confined at the lower end of the spool 25 to outside.

The embodiment operates as follows. In the shown state, since the fluid passage 34 connected to the chamber 33 is closed by the poppet 15 and the pilot spool 25, the poppet 15 cannot be shifted upward regardless of the application of the fluid pressure to the tapered portion 18 of the poppet 15. As a consequence, the poppet 15 is held in the shown position with the tapered portion 18 contacting with the valve seat 19, so that the flow of the pressurized fluid from the inlet port 16 to the outlet port 17 is interrupted.

When the pilot spool 25 is lifted upward by rotating the handle 27, the passage 34 is connected with the reservoir 21 through the reduced diameter portion 28 of the pilot spool 25, fluid passage 30, annular groove 32 and the passage 22, thus discharging the fluid in the chamber 33 into the reservoir 21. The discharge of the fluid permits the tapered portion 18 of the poppet 15 to separate from the valve seat 19 under the pressure of the pressurized fluid. As a consequence, the pressurized fluid supplied into the inlet port 16 is caused to flow into an actuator, not shown, of, for example, a die casting machine, connected to the outlet port 17 of the poppet valve. When the poppet 15 goes up to a position disconnecting the fluid passage 30 from the reduced diameter portion 28 of the pilot spool 25, the chamber 33 is also disconnected from the reservoir 21, so that the poppet 15 is held in the upper position maintaining a gap between the tapered portion 18 and the valve seat 19. More specifically, the poppet 15 is moved for a distance corresponding to the moved distance of the pilot spool 25.

When the pilot spool 25 is lowered at a time the poppet 15 is held in an upper position spaced apart from the valve seat 19, the pressurized fluid in the passage 20 flows into the chamber 33 through the groove 31, passage 29, reduced diameter portion 28 and the passage 34, thereby applying the fluid pressure to the rearside surface of the poppet 15. Since the area of the rearside surface is made larger than the cross-sectional area of the tapered portion 18 of the poppet 15 as described hereinbefore, the poppet 15 descends for a distance corresponding to the lowered distance of the pilot spool 25. The lowering of the poppet 15 narrows the gap between the tapered portion 18 and the valve seat 19, thereby reducing the flowrate of the fluid. When the poppet 15 descends to a position where the passage 29 is disconnected from the reduced diameter portion 28, the movement of the poppet 15 is stopped, thus maintaining a reduced gap between the tapered portion 18 and the valve seat 19. That is, the poppet 15 is also moved by a distance corresponding to the movement of the pilot spool in the case where the pilot spool is descended.

Although the handle 27 is provided for controlling the movement of the pilot spool 25, it is apparent that an electric motor or a solenoid valve may otherwise be used for controlling the movement of the pilot spool 25.

Figure 2:
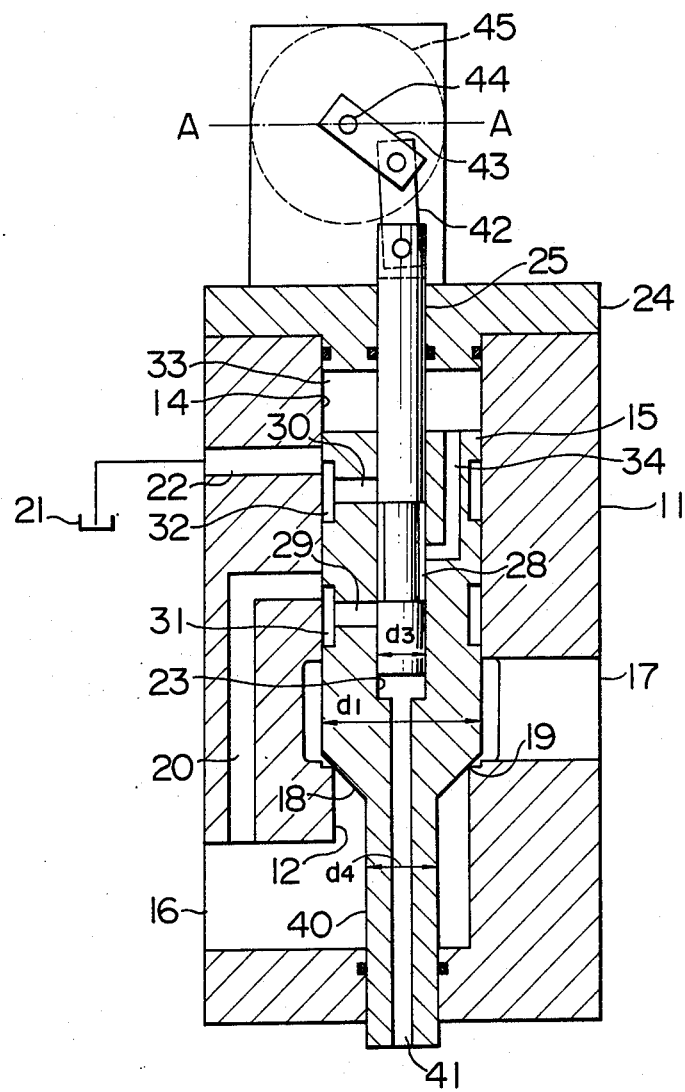
FIG. 2 is a longitudinal sectional view showing another embodiment of a poppet valve of this invention.

Another embodiment of this invention is disclosed hereunder with reference to FIG. 2 wherein similar members as those in FIG. 1 are designated by similar reference numerals.

In the embodiment shown in FIG. 2, a central hole 14 of a constant diameter is provided in a substantially cylindrical casing 11, and a poppet 15 having a diameter $d_1$ is slidably inserted in the central hole 14 of the casing 11. An inlet port 16 and an outlet port 17 are also provided through a lower portion of the casing 11 as viewed in FIG. 2. A valve seat 19 is formed in a lower part of the central hole 14 to be engageable with a tapered portion 18 of the poppet 15. A nose portion 40 having an outer diameter $d_4$ is further provided to extend from the tapered portion 18 of the poppet 15 downwardly. The nose portion 40 extends through the bottom wall of the casing 11 outwardly.

A fluid passage 20 is provided through the casing 11 for connecting an intermediate portion of the central hole 14 of the casing 11 with the inlet port 16. Another fluid passage 22 is provided through the casing 11 for connecting another intermediate portion of the central hole 14 with a reservoir 21 as in the case of the embodiment shown in FIG. 1. A central hole 23 is provided concentrically with the poppet 15. A pilot spool 25 of an outer diameter $d_3$ is inserted in the central hole 23 slidably. A reduced diameter portion 28 is also formed intermediately of the pilot spool 25. The pilot spool 25 extends upwardly through a cover 24 provided at the upper end of the casing 11 as in the embodiment shown in FIG. 1. The upper end of the pilot spool 25 is coupled with a driving shaft 44 of a control motor 45 through a link 42 and an arm 43 pivotally connected with each other. Although the displacing speed of the pilot spool 25 is comparatively low in the shown position of the arm 43, the displacing speed of the pilot spool 25 becomes maximum when the arm 43 is disposed in parallel with a line A—A in FIG. 2.

Within the casing 11, a chamber 33 is formed between the rearside (or upper) surface of the poppet 15 and the cover 24 that closes the upper end of the casing 11. Annular grooves 31 and 32 are formed around the outer surface of the poppet 15 to be connected through passages 29 and 30 to the central hole 23 of the poppet 15. Another passage 34 provided through the poppet 15 connects an intermediate portion of the central hole 23, which is located between the passages 29 and 30 to the chamber 33. Through the nose portion 40 of the poppet 15, a central passage 41 is provided for interconnecting the bottom portion of the central hole 23 of the poppet 15 with outside. The diameter $d_4$ of the nose portion 40 is selected to be larger than the outer diameter $d_3$ of the pilot spool 25. Preferably, the control motor 45 may be a stepping motor or a pulse motor.

The operation of the embodiment will now be described. In a state shown in FIG. 2, the fluid passage 34 connected with the chamber 33 is closed by the poppet 15 and the pilot spool 25, and hence the poppet 15 is held in the shown position regardless of the application of the pressurized fluid to the tapered portion 18 of the poppet 15. As a consequence, the flow of the pressurized fluid from the inlet port 16 to the outlet port 17 is interrupted by the tapered portion 18 of the poppet 15 contacting the valve seat 19.

When the control motor 45 is energized to rotate the driving shaft 44 for a predetermined angle in the counter-clockwise direction, the pilot spool 25 is moved upward, so that the chamber 33 formed between the rear-end surface of the poppet 15 and the cover 24 is communicated with the reservoir 21 through the reduced diameter portion 18 of the pilot spool 25. The poppet 15 is thus moved upward under the pressure of the pressurized fluid applied to the tapered portion 18. As a consequence, the tapered portion 18 is separated from the valve seat 19 to flow the pressurized fluid from the inlet port 16 to the outlet port 17 and thereby to operate an actuator, not shown, connected to the outlet port 17. When the poppet 15 goes up to a position where the fluid passage 30 is disconnected from the reduced diameter portion 28 of the pilot spool 25, the chamber 33 is disconnected from the reservoir 21 thereby stopping the upward movement of the poppet 15 and maintaining a gap between the tapered portion 18 of the poppet 15 and the valve seat 19. That is, the poppet 15 is moved for a distance corresponding to the moved distance of the pilot spool 25.

On the other hand, when the pilot spool 25 is moved downwardly under the control of the control motor 45 at a time the poppet 15 is held in a position higher than the shown position, the pressurized fluid in the passage 20 flows into the chamber 33 through the passage 29, reduced diameter portion 28 and the passage 34. Since the cross-sectional area of the rear end of the poppet 15 in the chamber 33 is $(\pi/4)(d_1^2-d_3^2)$, while the cross-sectional area of the forward end of the poppet 15, on which the pressurized fluid is applied effectively is $(\pi/4)(d_2^2-d_4^2)$, and since $d_4>d_3$, the cross-sectional area of the poppet 15 at the rear end thereof is larger than the effective cross-sectional area on the forward side thereof. As a consequence, the poppet 15 is moved downward to narrow the gap formed between the tapered portion 18 and the valve seat 19. Upon lowering of the poppet 15 to a position where the passage 29 is disconnected from the reduced diameter portion 28 of the pilot spool 25, the flow of the pressurized fluid into the chamber 33 is interrupted thereby terminating the downward movement of the poppet at a position maintaining a gap between the tapered portion 18 and the valve seat 19. That is, during the downward movement also, the poppet 15 is moved for a distance corresponding to the moved distance of the pilot spool 25.

According to the embodiment of the invention, since a nose portion of a sufficient diameter $d_4$ is provided to extend downwardly from the forward end of the poppet 15, the cross-sectional area of the rear end of the poppet 15 is made larger than the effective cross-sectional area of the forward end of the poppet. As a consequence, an additional member such as a spring is not required for increasing the retracting force of the poppet, thus simplifying the construction of the poppet valve. Furthermore, since the pilot spool 25 is coupled with the control motor 45 through a link mechanism, the displacing speed of the pilot spool 25 is varied substantially in accordance with a sine curve, so that an advantageous operation of the poppet valve wherein the poppet moves slowly in an initial stage but moves quickly in a terminating stage can be obtained. Although various devices may be used as the actuator connected to the outlet port of the poppet valve, an actuator combined with a die-casting machine is advantageously connected with the outlet port of the poppet valve.

What is claimed is:

1. In a poppet valve operable under a comparatively high back pressure, comprising:
    a valve casing having an internal bore opening upwardly;
    a cover plate provided to close said opening;
    a poppet inserted slidably in said internal bore, said poppet having a tapered surface portion operable as a valve which is engageable with a valve seat formed around said internal bore;
    a pilot spool slidable within a central hole of said poppet;
    inlet and outlet ports opening into said internal bore at positions located on different sides of said valve seat for supplying and delivering a pressurized fluid in and out of said internal bore; and
    first and second passage means for introducing and discharging, under the control of said pilot spool, a part of said pressurized fluid in and out of a chamber formed between said cover plate and an upper end of said poppet, thereby displacing said poppet toward and away from said valve seat, the improvement wherein means are provided to hold said pilot spool at a desired position, and said poppet is formed with a stepped construction having an upper end portion of a diameter $d_2$ and a lower end portion of a diameter $d_1$, said pilot spool having a diameter $d_3$, and the relation $$(d_2^2-d_3^2)>d_1^2$$

holds for the diameters $d_1$, $d_2$ and $d_3$.

2. A poppet valve according to claim 1, wherein an end of said pilot spool extending outwardly through said cover is coupled to and driven by a control motor.

3. A poppet valve according to claim 2, wherein said control motor is selected to be one of a stepping motor and a pulse motor.

4. In a poppet valve operable under a comparatively high back pressure, comprising:
    a valve casing having an internal bore opening upwardly;
    a cover plate provided to close said opening;
    a poppet inserted slidably in said bore, said poppet having a tapered surface portion operable as a valve which is engageable with a valve seat formed around said internal bore;
    a pilot spool slidable within a central hole of said poppet;
    inlet and outlet ports opening into said internal bore at positions located on different sides of said valve seat for supplying and delivering a pressurized fluid in and out of said internal bore; and
    first and second passage means for introducing and discharging under the control of said pilot spool, a part of said pressurized fluid in and out of a chamber formed between said cover plate and an upper end of said poppet, thereby displacing said poppet toward and away from said valve seat, the improvement wherein means are provided to hold said pilot spool at a desired position, and a nose portion is provided which extends from the tapered surface portion of said poppet downwardly so as to penetrate a bottom wall of said casing, said nose portion having a diameter $d_4$, while said poppet and said pilot spool have diameters $d_1$ and $d_3$, respectively, and the relation $$(d_1^2-d_3^2)>(d_1^2-d_4^2)$$

holds for the diameters $d_1$, $d_3$ and $d_4$.

5. A poppet valve according to claim 4, wherein an end of said pilot spool extending outwardly through said cover is coupled to and driven by a control motor.

6. A poppet valve according to claim 5 wherein said control motor is selected to be one of a stepping motor and a pulse motor.

* * * * *